United States Patent
Park

(10) Patent No.: US 11,305,652 B2
(45) Date of Patent: Apr. 19, 2022

(54) REGENERATIVE BRAKING CONTROL SYSTEM FOR MOTOR-DRIVEN VEHICLE

(71) Applicants: Hyundai Motor Company, Seoul (KR); Kia Motors Corporation, Seoul (KR)

(72) Inventor: Won Ki Park, Jeollabuk-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 32 days.

(21) Appl. No.: 17/028,545

(22) Filed: Sep. 22, 2020

(65) Prior Publication Data
US 2021/0347265 A1    Nov. 11, 2021

(30) Foreign Application Priority Data
May 11, 2020   (KR) .................. 10-2020-0055972

(51) Int. Cl.
| | |
|---|---|
| *B60L 7/22* | (2006.01) |
| *B60K 11/02* | (2006.01) |
| *H02P 3/14* | (2006.01) |
| *B60H 1/03* | (2006.01) |
| *H02P 3/04* | (2006.01) |
| *B60H 1/00* | (2006.01) |

(52) U.S. Cl.
CPC ............ *B60L 7/22* (2013.01); *B60H 1/00392* (2013.01); *B60H 1/03* (2013.01); *B60K 11/02* (2013.01); *H02P 3/04* (2013.01); *H02P 3/14* (2013.01)

(58) Field of Classification Search
CPC ......... B60L 7/22; B60H 1/00392; B60H 1/03; B60K 11/02; H02P 3/04; H02P 3/14
USPC ....................................... 318/376, 375, 362
See application file for complete search history.

(56) References Cited

U.S. PATENT DOCUMENTS 7,808,195 B2 * 10/2010 Kitanaka .................. B60L 9/22
318/442

* cited by examiner

*Primary Examiner* — David Luo
(74) *Attorney, Agent, or Firm* — Mintz Levin Cohn Ferris Glovsky and Popeo, P.C.; Peter F. Corless

(57) ABSTRACT

A regenerative braking control system for a motor-driven vehicle is configured to provide a continuous assistant braking force by continuous reverse torque of an electric motor by enabling surplus electrical energy produced by an electric motor to be easily converted into thermal energy in generative braking, using both of a brake resistor and a heater to convert electrical energy into thermal energy, and being able to obtain an interior heating effect by using thermal energy converted by the brake resistor and the heater as heat source for interior heating without discharging the thermal energy to the outside.

17 Claims, 8 Drawing Sheets heater:ON, heater blower:ON, brake resistor:OFF heater:OFF, heater blower:OFF, brake resistor:ON heater:ON, heater blower:ON, brake resistor:ON heater:ON, heater blower:OFF, brake resistor:ON

REGENERATIVE BRAKING CONTROL SYSTEM FOR MOTOR-DRIVEN VEHICLE

CROSS REFERENCE TO RELATED APPLICATION

The present application claims under 35 U.S.C. § 119(a) the benefit of Korean Patent Application No. 10-2020-0055972, filed May 11, 2020, the entire contents of which are incorporated by reference herein.

BACKGROUND

(a) Technical Field

The present disclosure relates to a regenerative braking control system for a motor-driven vehicle, more particularly, to the regenerative braking control system capable of performing not only regenerative braking, but also interior heating, using a brake resistor and a heater.

(b) Description of the Related Art

As is well known in the art, eco-friendly vehicles such as a hybrid vehicle, an electric vehicle, and a fuel cell electric vehicle are driven by an electric motor.

The electric motor not only drives a vehicle, but also functions as a power generator that performs regenerative braking for assisting braking when the vehicle is decelerated or coasts on a downhill road, and charges a battery by converting kinetic energy of a vehicle into electrical energy.

However, when charging according to regenerative braking of an electric motor due to full charging of a battery or when regenerative braking force of the electric motor is insufficient, a specific assistant brake is required to satisfy brake assist regulations.

The assistant brake refers to a device that can reduce load on a main brake such as a hydraulic brake and can maintain a braking effect for a long time, and is usually classified into three types: an exhaust brake, a jake brake, and a retarder brake.

The exhaust brake is a device that obtains a deceleration effect by reducing the RPM of an engine by blocking the path of exhaust gas. The jake brake is a device that decreases compression pressure by forcibly opening exhaust valves at the end of compression in an engine and obtains a deceleration effect by reducing power from an engine. The retarder brake is a device that decelerates a vehicle by applying resistance such as hydraulic or electromagnetic resistance to torque of a propeller shaft.

However, when an eco-friendly vehicle is equipped with an assistant brake such as the exhaust brake, the jake brake, or the retarder brake, there is a problem that the number of parts increases, the cost increases, the assembly convenience of a package is deteriorated, or the like.

Accordingly, a brake resistor that performs regenerative braking using an electric motor and discharges electrical energy produced by an electric motor as thermal energy has been applied to satisfy brake assist regulations.

FIG. 1 (RELATED ART) is a circuit diagram showing a charging/discharging and cooling system for a fuel cell vehicle, and FIG. 2 (RELATED ART) is a schematic view showing a brake resistor.

As shown in FIG. 1, a fuel cell 10 is connected to an electric motor 13 through a converter 11 to be able to supply power, and the fuel cell 10 and the electric motor 13 are connected to a battery 16 through an inverter 12 to be able to charge and discharge the battery 16.

In particular, a brake resistor 15 that converts electrical energy produced by the electric motor 13 into thermal energy is connected to the electric motor 13 through a high-voltage connector.

Referring to FIG. 2, a high-voltage connector 15-1 for connection with the electric motor 13 is formed at a side of the brake resistor 15, and a cooling water inlet 15-2 and a cooling water outlet 15-3 that are connected to a cooling water circulation line 20 is formed at another side of the brake resistor 15 to circulate cooling water through the brake resistor 15.

The fuel cell 10, the converter 11, the inverter 12, the electric motor 13, and the brake resistor 15 generate heat when they are operated, so they need to be cooled for thermal protection and to ensure adequate performance.

To this end, the cooling water circulation line 20 is connected to the fuel cell 10, the converter 11, the inverter 12, the electric motor 13, and the brake resistor 15, and a water pump 17 for circulating cooling water and a radiator 18 for cooling high-temperature cooling water that has finished cooling are disposed in the cooling water circulation line 20.

Cooling water channels (not shown) that communicate with the cooling water circulation line 20 are formed in the fuel cell 10, the converter 11, the inverter 12, the electric motor 13, and the brake resistor 15.

Accordingly, when the electrical energy produced by the fuel cell 10 is converted by the converter 11 and then directly supplied to the electric motor 13, the electric motor 13 operates and a vehicle can be driven.

Alternatively, when the electrical energy produced by the fuel cell 10 is accumulated in the battery 16 through the inverter 12 and is then supplied to the electric motor 13 through the converter 11 from the battery 16, the electric motor 13 operates and a vehicle can be driven.

However, when a vehicle is decelerated or coasts, regenerative braking in which the electric motor 13 operates as a power generator is performed. Further, in the regenerative braking, the electrical energy produced by the electric motor 13 is accumulated in the battery 16 through the inverter 12, and an assistant braking force is generated by reverse torque of the electric motor 13.

According to the above-described process, the electric motor 13 performs the function of an assistant brake that generates an assistant braking force by generating reverse torque, but the reverse torque can be continuously generated only when the produced electrical energy is consumed.

However, when the battery 16 is fully charged, the electrical energy produced by the electric motor 13 becomes surplus electrical energy that cannot be further accumulated in generative braking, and an assistant braking force by continuous reverse torque of the electric motor 13 can be generated only when the surplus electrical energy is consumed.

Accordingly, the brake resistor 15 consumes the surplus electrical energy produced by the electric motor 13 by converting the surplus electrical energy into thermal energy to satisfy brake assist regulations, whereby an assistant braking force can be continuously generated by continuous reverse torque of the electric motor 13.

However, there is a limit in converting the surplus electrical energy produced by the electric motor 13 into thermal energy using only the brake resistor 15, and there is a problem that the converted thermal energy is discharged outside and consumed without being used for any purpose.

SUMMARY

The present disclosure provides a regenerative braking control system for a motor-driven vehicle, the regenerative braking control system being able to provide a continuous assistant braking force by continuous reverse torque of an electric motor by enabling surplus electrical energy produced by an electric motor to be easily converted into thermal energy in generative braking, using both of a brake resistor and a heater to convert electrical energy into thermal energy.

Another objective of the present disclosure is to obtain an interior heating effect by using thermal energy converted by the brake resistor and the heater as heat source for interior heating without discharging the thermal energy to the outside.

In order to achieve the objectives of the present disclosure, a regenerative braking control system for a motor-driven vehicle includes: an electric motor configured to charge a battery with an electrical energy by operating as a power generator in regenerative braking; a brake resistor configured to convert surplus electrical energy produced by the electric motor into thermal energy in regenerative braking; a heater configured to convert surplus electrical energy produced by the electric motor into thermal energy together with the brake resistor; a cooling water circulation line connected to the brake resistor and the heater so that cooling water can circulate; and a controller configured to control the brake resistor and the heater to be turned on and off on the basis of charged amount information of the battery so that a heating mode, a regenerative braking mode, a heating and regenerative braking mode, and a maximum regenerative braking mode are performed.

The cooling water circulation line may include: a heating line extending from the heater and connected to a heater blower for interior heating; a first cooling water return line extending from the heating line and connected to a radiator through the brake resistor; a second cooling water return line extending from the heater blower and connected to the radiator; and a cooling water supply line extending from the radiator and connected to the heater.

A 3-way valve controlled to be opened and closed in order to send cooling water to the heater blower or the brake resistor may be disposed at a joint of the heating line and the first cooling water return line, and an electric water pump may be disposed in the cooling water supply line.

In the heating mode, the heater, the electric water pump, and the heater blower may be operated, the 3-way valve may be operated to open to the heating line and close to the first cooling water return line, and the brake resistor may remain off in response to a control signal from the controller.

When medium-temperature cooling water heated by the heater flows through the heating line and the heater blower, air to be blown to an interior by the heater blower may be heated by the medium-temperature cooling water, whereby interior heating may be performed.

In the regenerative braking mode, the brake resistor and the electric water pump may be operated, the 3-way valve may be operated to close to the heating line and open to the first cooling water return line, and the heater and the heater blower may remain off in response to a control signal from the controller.

In the regenerative braking mode, surplus electrical energy produced by the electric motor may be converted and consumed as thermal energy by the brake resistor, whereby an assistant braking force may be continuously generated by continuous reverse torque of the electric motor.

In the regenerative braking mode, low-temperature cooling water flowing through a cooling water supply line from the radiator by operation of the electric water pump may flow through a first cooling water return line and may cool the brake resistor, and high-temperature cooling water coming out of the brake resistor after cooling the brake resistor may flow back to the radiator.

In the heating and regenerative braking mode, the brake resistor, the electric water pump, the heater, and the heater blower may be turned on and operated, and the 3-way valve may be operated to an angle for opening to both of the heating line and the first cooling water return line in response to a control signal from the controller.

The brake resistor and the heater convert surplus electrical energy produced by the electric motor into thermal energy for the regenerative braking mode in the heating and regenerative braking mode, whereby an assistant braking force may be continuously generated by continuous reverse torque of the electric motor.

When medium-temperature cooling water heated by the heater for the heating mode in the heating and regenerative braking mode flows through the heating line and the heater blower, air to be blown to an interior by the heater blower may be heated by the medium-temperature cooling water, whereby interior heating may be performed.

Medium-temperature cooling water heated by the heater may flow to the brake resistor through a first cooling water return line by operation of the electric water pump and high-temperature cooling water after cooling the brake resistor may flow to a radiator for cooling.

In the maximum regenerative braking mode, the brake resistor, the electric water pump, and the heater may be turned on and operated, the 3-way valve may be operated to close to the heating line and open to the first cooling water return line, and the heater blower may remain off in response to a control signal from the controller.

In the maximum regenerative braking mode, the brake resistor and the heater may convert surplus electrical energy produced by the electric motor into thermal energy, whereby an assistant braking force may be continuously generated by continuous reverse torque of the electric motor. Further, when a State of Charge (SOC) of the battery is 100%, electrical energy produced by the electric motor may wholly become surplus electrical energy and may be converted and consumed as thermal energy by the brake resistor and the heater, whereby an assistant braking force may be maximally generated by continuous reverse torque of the electric motor.

Low-temperature cooling water flowing through a cooling water supply line from a radiator by operation of the electric water pump may sequentially cool the hater and the brake resistor while passing through cooling water channels of the heater and the brake resistor, and high-temperature cooling water coming out of the brake resistor after cooling the brake resistor may flow back to the radiator.

The present disclosure provides the following effects from the objectives described above.

First, since surplus electrical energy produced by the electric motor can be converted into thermal energy by the heater in addition to the brake resistor in regenerative braking, an assistant braking force can be continuously obtained by continuous reverse torque of the electric motor.

Second, since surplus electrical energy produced by the electric motor is converted into thermal energy by the brake resistor and the heater and then used as a heat source for interior heating without being discharged outside in regenerative braking, an interior heating effect can also be achieved.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

Figure 1:
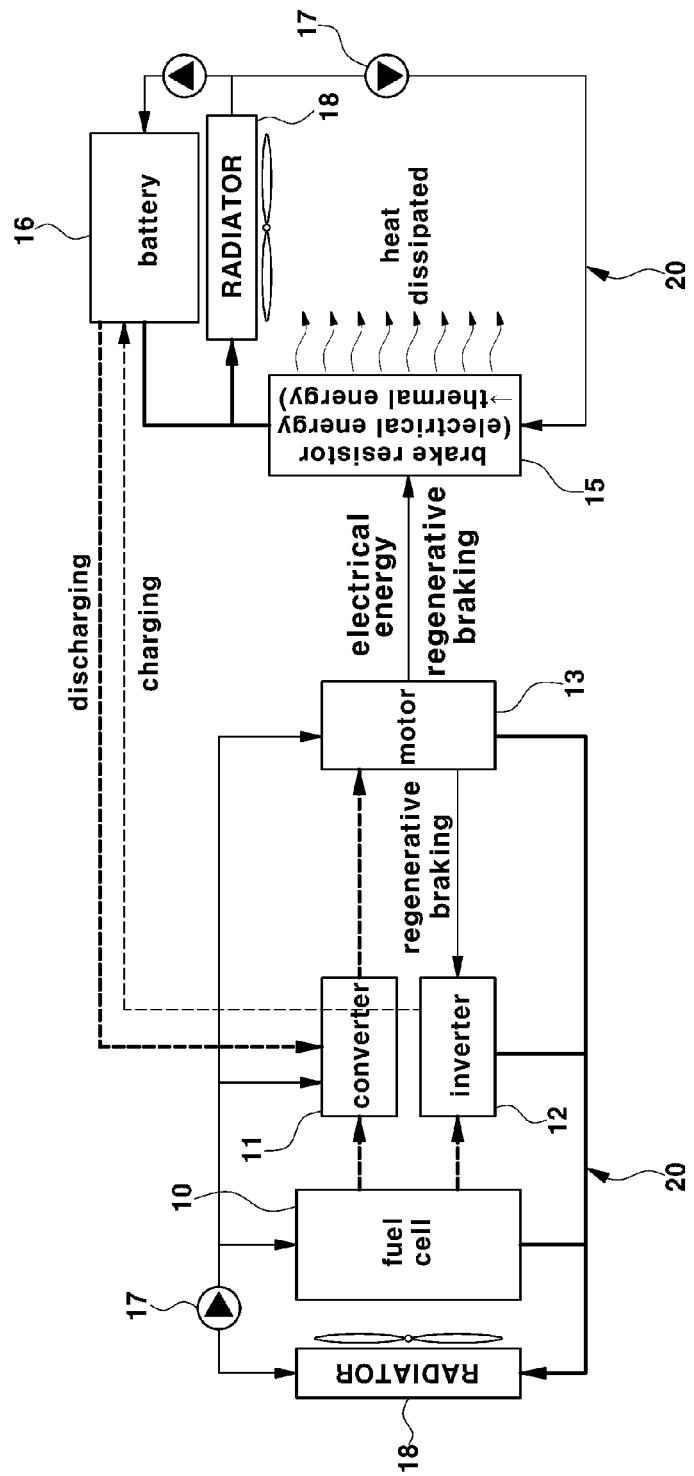
FIG. 1 (RELATED ART) is a diagram showing charging/discharging and a cooling system for a fuel cell vehicle.
Figure 2:
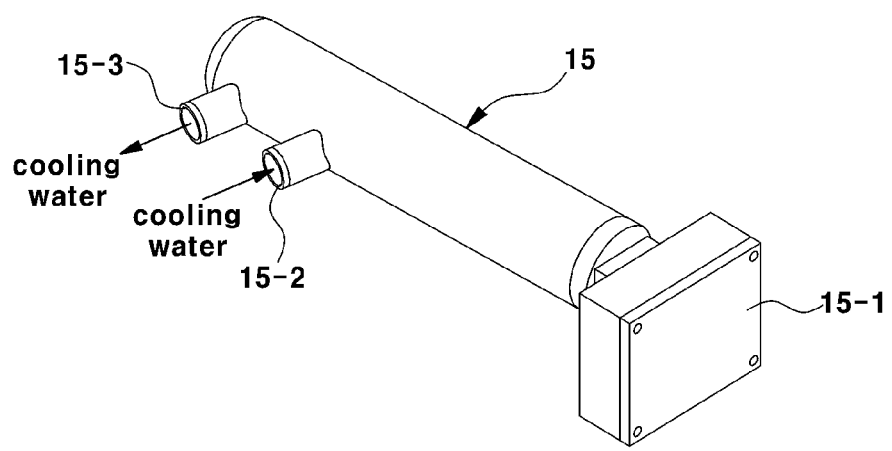
FIG. 2 (RELATED ART) is a schematic view showing a brake resistor.
Figure 3:
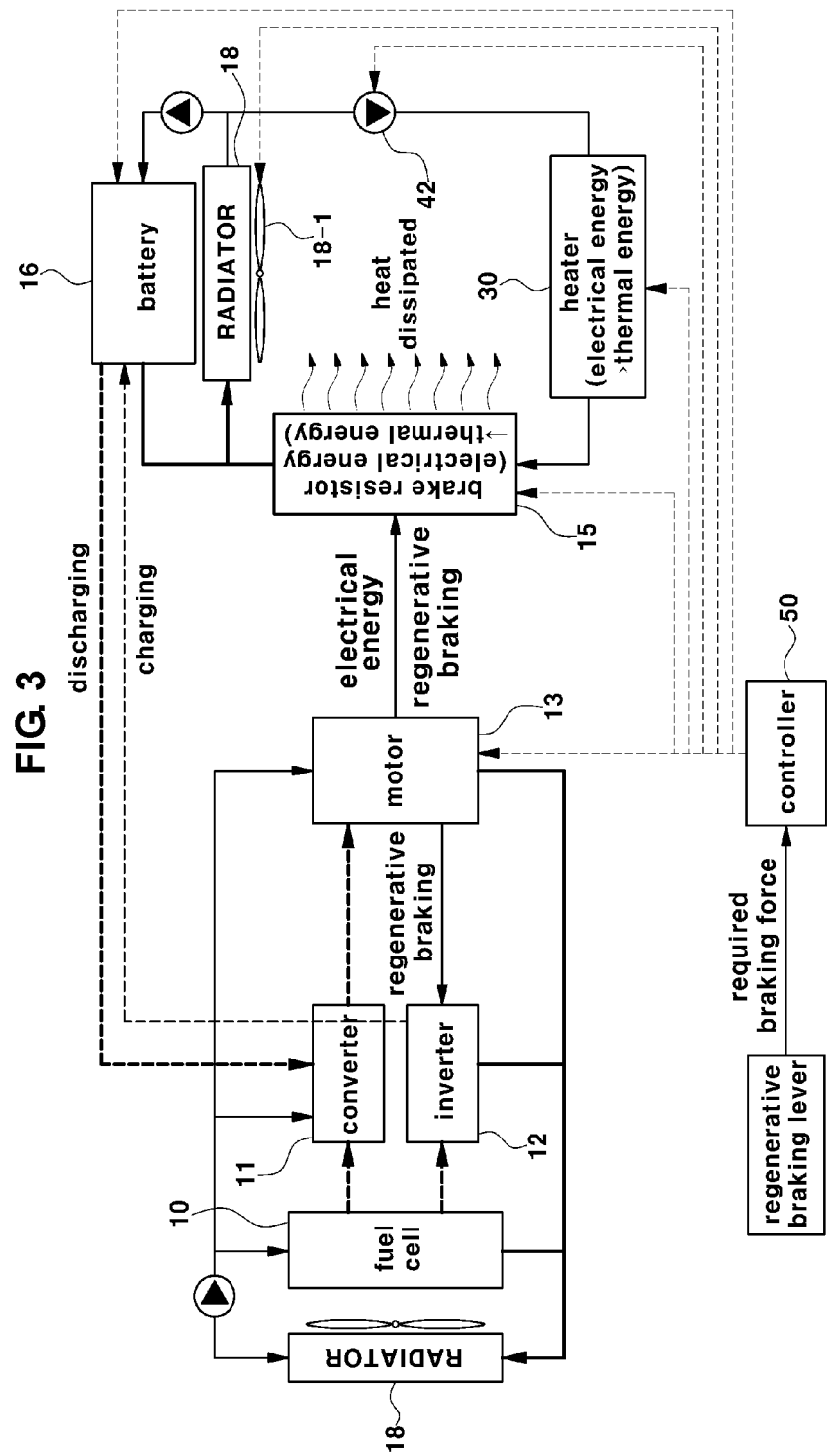
FIG. 3 is a diagram showing a regenerative braking control system for a motor-driven vehicle according to the present disclosure.
Figure 4:
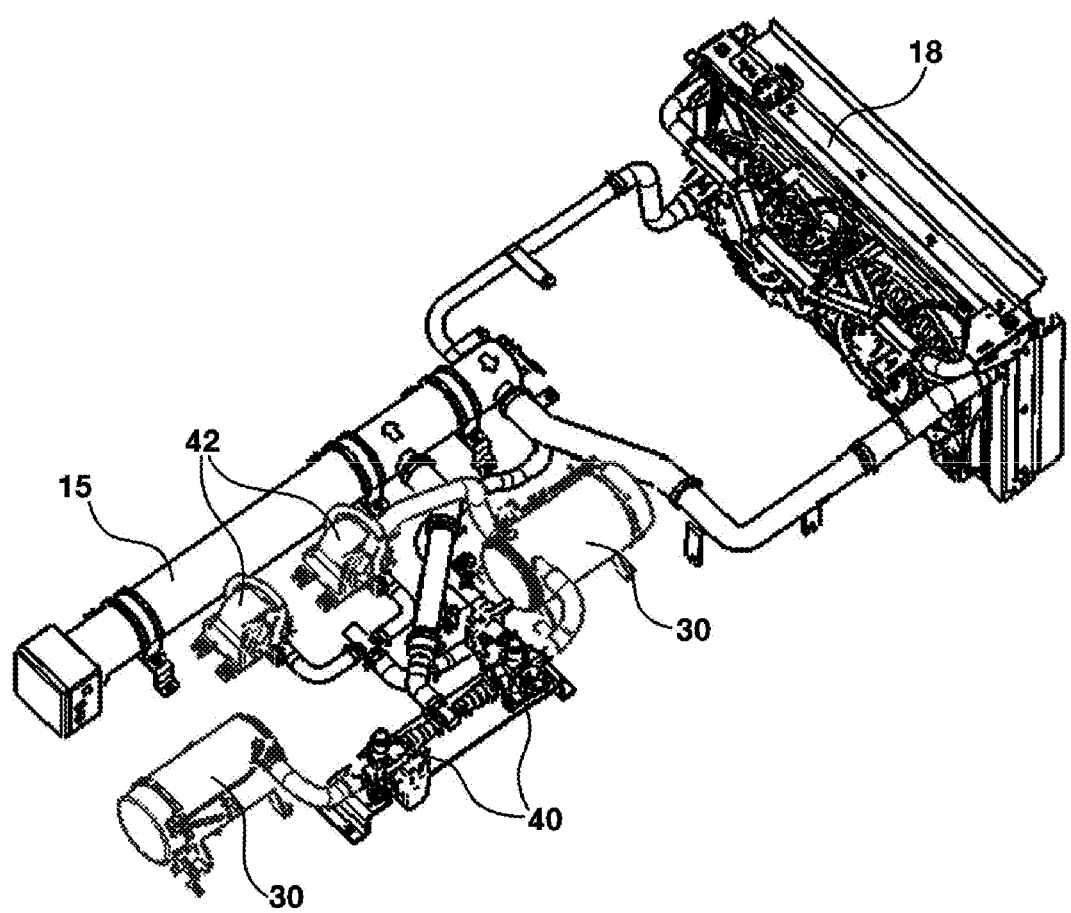
FIG. 4 is a schematic view showing the arrangement state of a brake resistor and a heater for the regenerative braking control system for a motor-driven vehicle according to the present disclosure.

In the accompanying drawings, FIGS. 3 and 4 shows a regenerative braking control system for a motor-driven vehicle according to the present disclosure, and FIGS. 5 to 8 are cooling circuit diagrams of the regenerative braking control system for a motor-driven vehicle according to the present disclosure.

Referring to FIG. 3, a fuel cell 10 is connected to an electric motor 13 through a converter 11 to be able to supply power, and the fuel cell 10 and the electric motor 13 are connected to a battery 16 through an inverter 12 to be able to charge and discharge the battery 16.

A brake resistor 15 that converts electrical energy produced by the electric motor 13 into thermal energy is connected to the electric motor 13 through a high-voltage connector.

Accordingly, when the electrical energy produced by the fuel cell 10 is converted by the converter 11 and then directly supplied to the electric motor 13 or when the electrical energy produced by the fuel cell 10 is accumulated in the battery 16 through the inverter 12 and is then supplied to the electric motor 13 through the converter 11 from the battery 16, the electric motor 13 operates and a vehicle can be driven.

However, when a vehicle is decelerated or coasts, regenerative braking in which the electric motor 13 operates as a power generator is performed. Further, in the regenerative braking, the electrical energy produced by the electric motor 13 is accumulated in the battery 16 through the inverter 12 and an assistant braking force is generated by reverse torque of the electric motor 13.

However, when the battery 16 is fully charged, the electrical energy produced by the electric motor 13 becomes surplus electrical energy that cannot be further accumulated in generative braking, and an assistant braking force by continuous reverse torque of the electric motor 13 can be generated only when the surplus electrical energy is consumed.

Accordingly, the brake resistor 15 consumes the surplus electrical energy produced by the electric motor 13 by converting the surplus electrical energy into thermal energy in regenerative braking, whereby an assistant braking force can be continuously generated by continuous reverse torque of the electric motor 13.

The regenerative braking control system for a motor-driven vehicle includes a brake resistor 15 and a heater 30 that are controlled to be turned on/off by a controller on the basis of the charged amount information of a battery in order to convert surplus electrical energy produced by the electric motor 13 into thermal energy.

Accordingly, in generative braking, the surplus electrical energy produced by the electric motor 13 is converted into thermal energy by not only the brake resistor 15, but also the heater 30, so it is possible to reduce the operation load of the brake resistor 15 and completely convert and consume the surplus electrical energy into thermal energy. Therefore, an assistant braking force can be continuously generated by continuous reverse torque of the electric motor 13.

Figure 5:
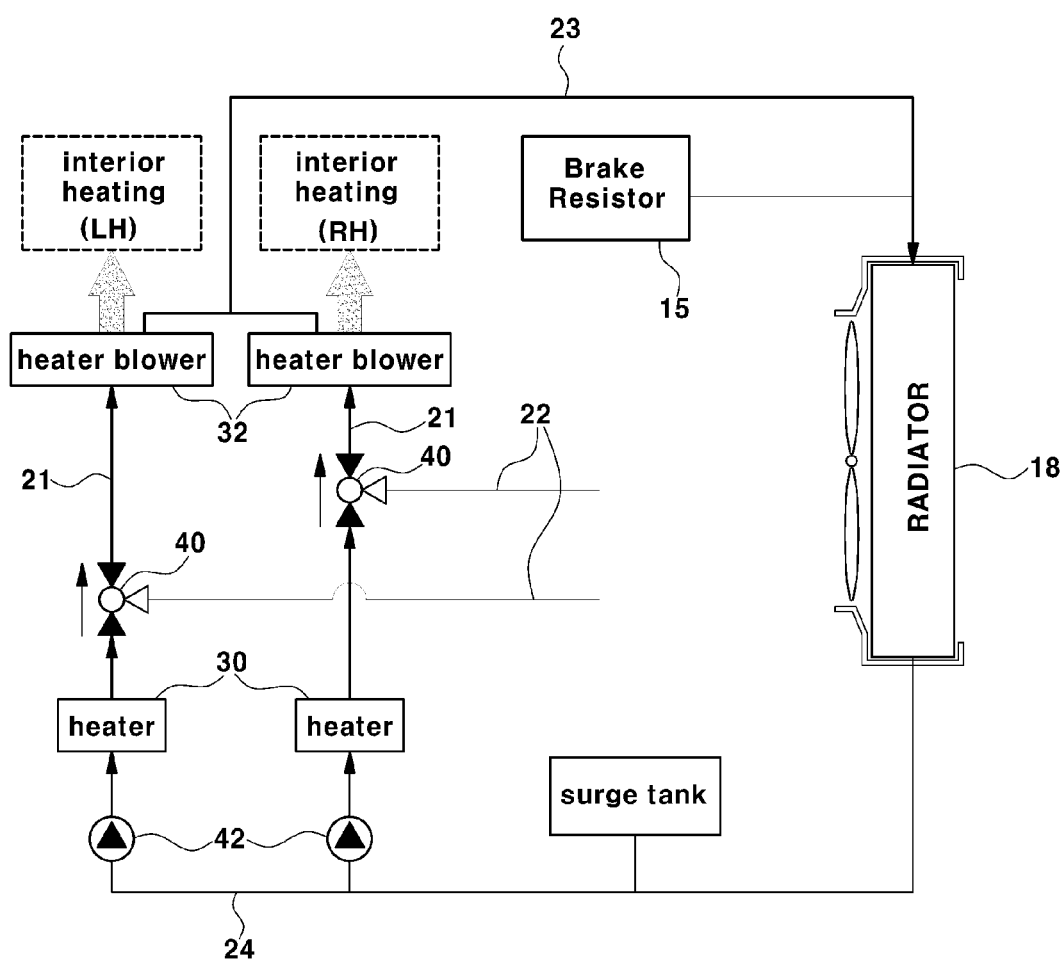
FIG. 5 is a circuit diagram showing the flow of cooling water when the regenerative braking control system for a motor-driven vehicle according to the present disclosure operates for heating.

The heater 30 is also used, other than the brake resistor 1, to convert the surplus electrical energy produced by the electric motor 13 into thermal energy in the above description. However, as shown in FIG. 5, it is possible to consume the surplus electrical energy produced by the electric motor 13 by sequentially operating an electric water pump 42, and an electric cooling fan 18-1 of a radiator 18 before operating the heater 30, thereby being able to secure an assistant braking force by continuous reverse torque of the electric motor 13.

According to the present disclosure, the thermal energy converted by the brake resistor 15 and the heater is not discharged outside and consumed without being used for any purpose, but is used as a heat source for interior heating, whereby an interior heating effect can be achieved.

To this end, a heater blower 32, a 3-way valve 40, etc. for interior heating other than the brake resistor 15 and the heater 30 are connected so that cooling water can be circulated through a cooling water circulation line.

Obviously, cooling water channels (not shown) through which cooling water circulates are formed in the brake resistor 15, the heater 30, the heater blower 32, etc.

Referring to FIGS. 5 to 8, the cooling water circulation line is composed of a heating line 21 extending from the heater 30 and connected to the heater blower 32 for interior heating, a first cooling water return line 22 extending from the heating line 21 and connected to an inlet of the radiator 18 through the brake resistor 15, a second cooling water return line 23 extending from the heater blower 32 and connected to the inlet of the radiator 18, and a cooling water supply line 24 extending from an outlet of the radiator 18 and connected to the heater 30.

The 3-way valve 40 controlled to be opened/closed by the controller in order to send cooling water to the heater blower 32 or the brake resistor 15 is disposed at the joint of the heating line 21 and the first cooling water return line 22.

The electric water pump 42 that is controlled to operate by the controller 50 is disposed in the cooling water supply line 24.

The brake resistor 15, heater 30, heater blower 32, electric water pump 42, etc. connected to each other by the cooling water circulation line so that cooling water can circulate are controlled to be turned on/off by the controller 50 on the basis of the charged amount information of the battery in interior hating and regenerative braking.

The operation flow when the regenerative braking control system for a motor-driven vehicle according to the present disclosure operates for heating and regenerative braking will be described in each mode.

Normal Mode

A normal mode is a mode in which whether parts are operated is checked and the parts are initialized when a vehicle is started up.

For example, when a vehicle is started up, the controller 50 checks an abnormal signal showing disconnection of parts including the brake resistor 15, a short circuit, etc., and checks whether a valve diaphragm of the 3-way valve 40 is at an initial neutral angle (e.g., 45° at which cooling line can flow to the heating line 21 and the first cooling water return line 22) so that cooling water is smoothly injected into the heating line 21, the first cooling water return line 22, the second cooling water return line 23, and the cooling water supply line 24 of the cooling water circulation line.

Heating Mode

A heating mode is a mode in which an interior of a vehicle is heated by a heater.

To this end, as shown in FIG. 5, when a heater switch in the interior is operated, the heater 30, the electric water pump 42, and the heater blower 32 are operated and the brake resistor 15 remains off in response to a control signal from the controller 50.

Further, the 3-way valve 40 is operated to an angle for opening to the heating line 21 and closing to the first cooling water return line 22 in response to the control signal from the controller 50.

Accordingly, cooling water flowing from the radiator 18 to the cooling water supply line 24 passes through the heater 30 by the operation of the electric water pump 42 and is heated by the heater 30.

Further, when medium-temperature cooling water heated by the heater 30 passes through the heating line 21 and the heater blower 32, air to be blown to the interior by the heater blower 32 is heated by the medium-temperature cooling water and the heated air is blown to the interior, whereby the interior can be heated without difficulty.

For example, a cooling water channel (not shown) of the heater blower 32 through which the medium-temperature cooling water is positioned ahead of a blowing fan of the heater blower 32, whereby the air to be blown to the interior by the blowing fan of the heater blower can be heated. Further, the heated air is blown to the interior, so the interior can be easily heated.

Meanwhile, as shown in FIG. 5, the cooling water that has finished cooling, that is, the medium-temperature cooling water that has passed through the heater blower 32 flows to the radiator 18 through the second cooling water return line 23.

Regenerative Braking Mode

A regenerative braking mode is a mode in which when an eco-friendly vehicle is decelerated or coasts, the electric motor 13 operates as a power generator, electrical energy produced by the electric motor 13 is accumulated in the battery 16 through the inverter 12, and an assistant braking force is generated by reverse torque of the electric motor 13.

Figure 6:
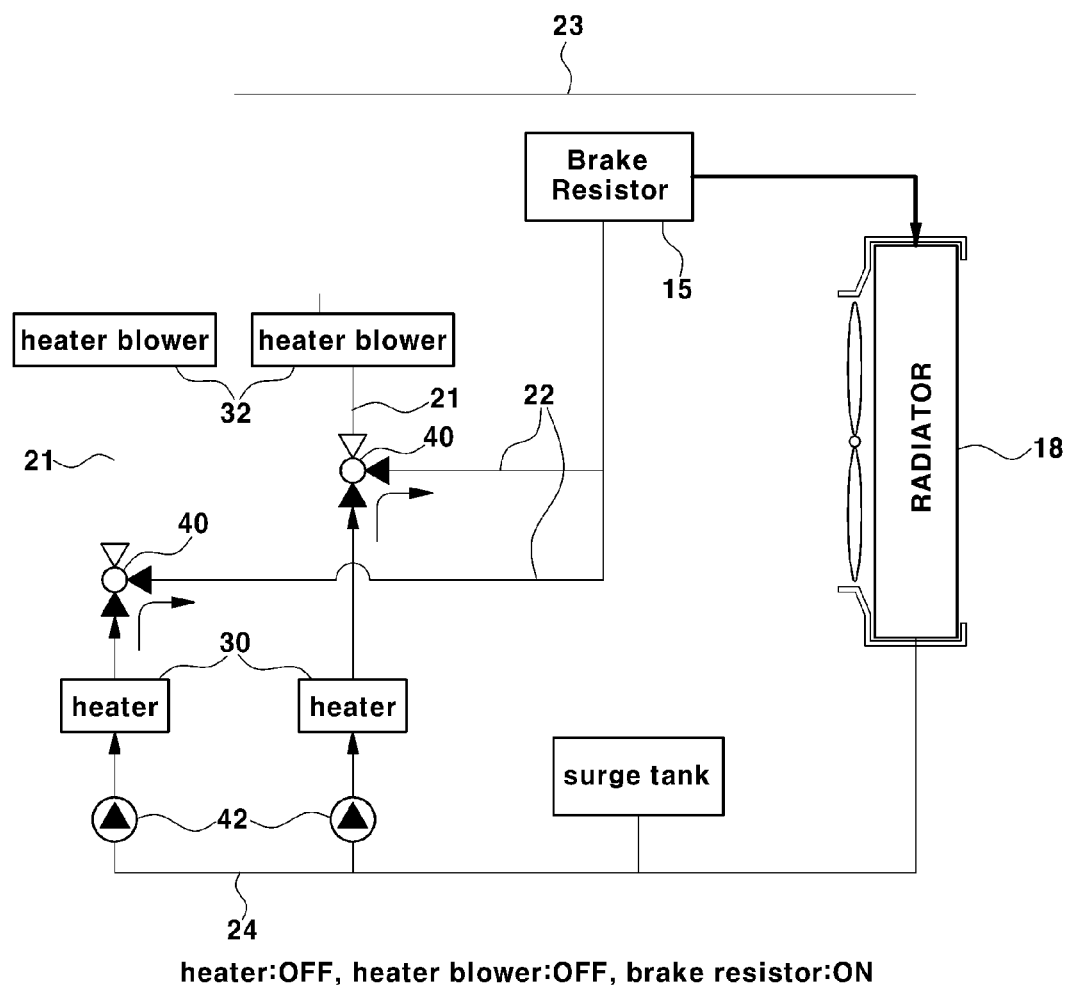
FIG. 6 is a circuit diagram showing the flow of cooling water when the regenerative braking control system for a motor-driven vehicle according to the present disclosure operates for regenerative braking.

To this end, as shown in FIG. 6, the brake resistor 15 is turned on and operated, the electronic water pump 42 is also operated, but the heater 30 and the heater blower 32 remain off in response to a control signal from the controller 50.

Further, the 3-way valve 40 is operated to an angle for closing to the heating line 21 and opening to the first cooling water return line 22 in response to the control signal from the controller 50.

Accordingly, in regenerative braking, the brake resistor 15 consumes the surplus electrical energy produced by the electric motor 13 by converting the surplus electrical energy into thermal energy in regenerative braking, whereby an assistant braking force can be continuously generated by continuous reverse torque of the electric motor 13.

For example, when the temperature of the battery is 15° C., the State Of Charge (SOC) of the battery is 80%, and the chargeable capacity of the battery in regenerative braking is 68 kW, it may be required to generate a total of 91 kW of electricity including additional power (e.g., 23 kW) for generating continuous reverse torque to satisfy a braking force required for a vehicle other than the power of 68 kW generated to charge the battery by the electric motor 13. Accordingly, in this case, the brake resistor 15 converts and consumes the additional power (e.g., 23 kW) that is surplus electrical energy into thermal energy.

As described above, in regenerative braking, the brake resistor 15 consumes the surplus electrical energy produced by the electric motor 13 by converting the surplus electrical energy into thermal energy in regenerative braking, whereby an assistant braking force can be continuously obtained by continuous reverse torque of the electric motor 13.

On the other hand, as shown in FIG. 6, low-temperature cooling water flowing through the cooling water supply line 24 from the radiator by the operation of the electric water pump 42 flows through the first cooling water return line 22 and cools the brake resistor 15 while flowing through the cooling water channel of the brake resistor 15. Further, high-temperature cooling water coming out of the brake resistor 15 after cooling the brake resistor 15 flows back to the radiator 18.

Heating and Regenerative Braking Mode

A heating and regenerative braking mode is a mode in which the heating mode and the regenerative braking mode are simultaneously performed.

Figure 7:
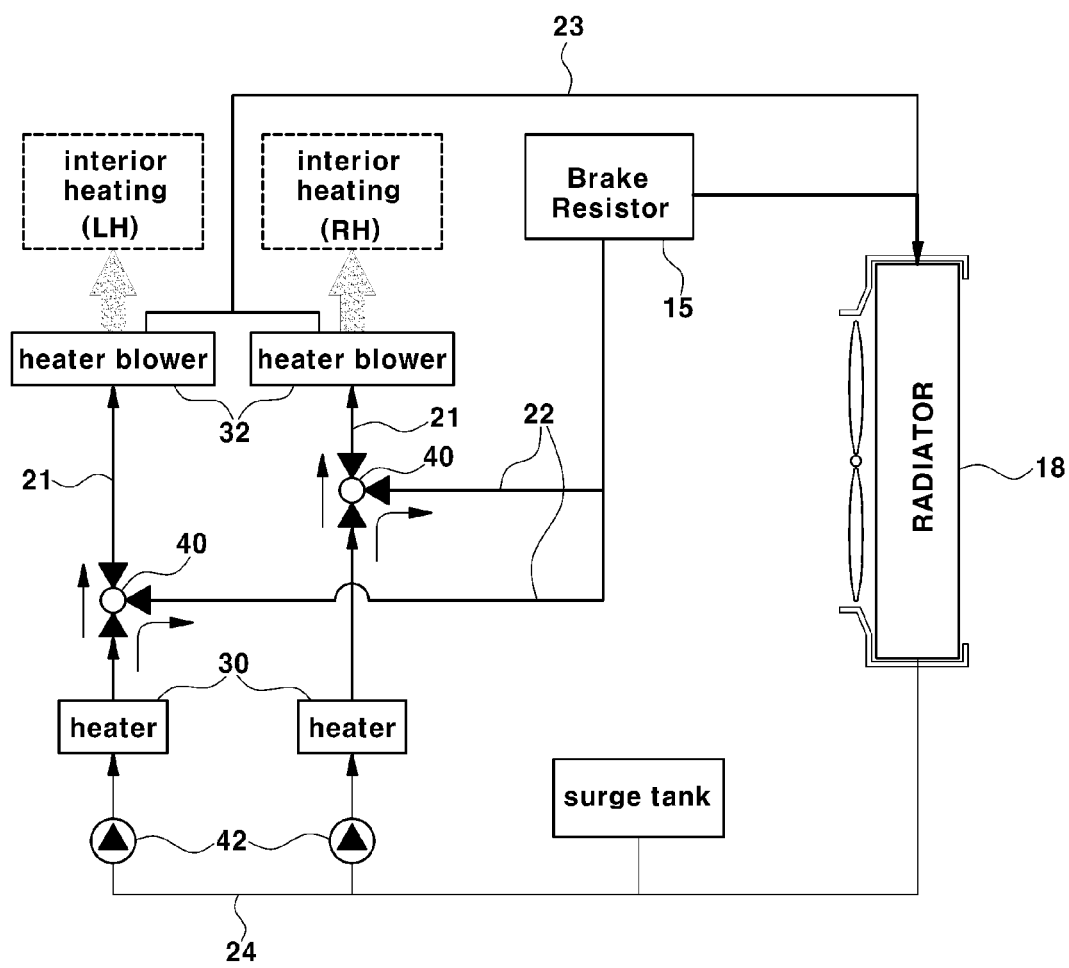
FIG. 7 is a circuit diagram showing the flow of cooling water when the regenerative braking control system for a motor-driven vehicle according to the present disclosure operates for heating and regenerative braking.

To this end, as shown in FIG. 7, the brake resistor 15 is turned on and operated, the electronic water pump 42 is also operated, and the heater 30 and the heater blower 32 are also turned on in response to a control signal from the controller 50.

For example, since the SOC of the battery is 80%, the battery needs to be charged for regenerative braking, but when the temperature of the battery is 0° C., it is lower than the temperature of the external air and it is determined that interior heating is needed. Accordingly, the controller 50 turns on the heater 30 and the heater blower 32 in addition to the brake resistor 15.

Accordingly, in regenerative braking, the surplus electrical energy produced by the electric motor 13 is converted into thermal energy by not only the brake resistor 15, but also by the heater 30, so it is possible to reduce the operation load of the brake resistor 15 and completely convert and consume the surplus electrical energy into thermal energy. Therefore, an assistant braking force can be continuously generated by continuous reverse torque of the electric motor 13.

For example, when the temperature of the battery is 0° C., the State Of Charge (SOC) of the battery is 80%, and the chargeable capacity of the battery in regenerative braking is 33 kW, it may be required to generate a total of 91 kW of electricity including additional power (e.g., 58 kW) for generating continuous reverse torque to satisfy a braking force required for a vehicle other than the power of 33 kW generated to charge the battery by the electric motor 13. Accordingly, in this case, the brake resistor 15 has a limit in converting and consuming the additional power (e.g., 58 kW) that is surplus electrical energy into thermal energy.

Accordingly, the additional power (e.g., 58 kW) that is surplus electrical energy is converted into thermal energy by not only the brake resistor 15, but also the heater 30, whereby it is possible to reduce the operation load of the brake resistor 15 and completely convert and consume the surplus electrical energy into thermal energy. Therefore, an assistant braking force can be continuously generated by continuous reverse torque of the electric motor 13.

Meanwhile, the 3-way valve 40 is operated to an angle for opening to both the heating line 21 and the first cooling water return line 22 in response to the control signal from the controller 50.

For example, the valve diaphragm of the 3-way valve is controlled to 75°, so cooling water flows to the heating line 21 by 15% and to the first cooling water return line 22 by 75%.

Accordingly, as shown in FIG. 7, medium-temperature cooling water heated by the heater 30 passes through the heating line 21 and the heater blower 32, air to be blown to the interior by the heater blower 32 is heated by the medium-temperature cooling water, and the heated air is blown to the interior, whereby the interior can be heated without difficulty.

Further, medium-temperature cooling water heated by the heater 30 flows to the brake resistor 15 through the first cooling water return line 22 by the operation of the electric water pump 42 and high-temperature cooling water that has cooled the brake resistor 15 flows into the radiator 18 for cooling. Further, medium-temperature cooling water that has passed through the heater blower 32 also flows into the radiator 18 through the second cooling water return line 23.

According to the heating and regenerative braking mode, since not only the brake resistor 15, but also the heater 30 convert surplus electrical energy into thermal energy, an assistant braking force is continuously provided by continuous reverse torque of the electric motor 13, thereby being able to satisfy the required braking force. Further, an interior heating effect by the operation of the heater 30 can be achieved.

Maximum Regenerative Braking Mode

A maximum regenerative braking mode is a mode in which a limit assistant braking force is provided to satisfy a required braking force for a vehicle in regenerative braking.

Figure 8:
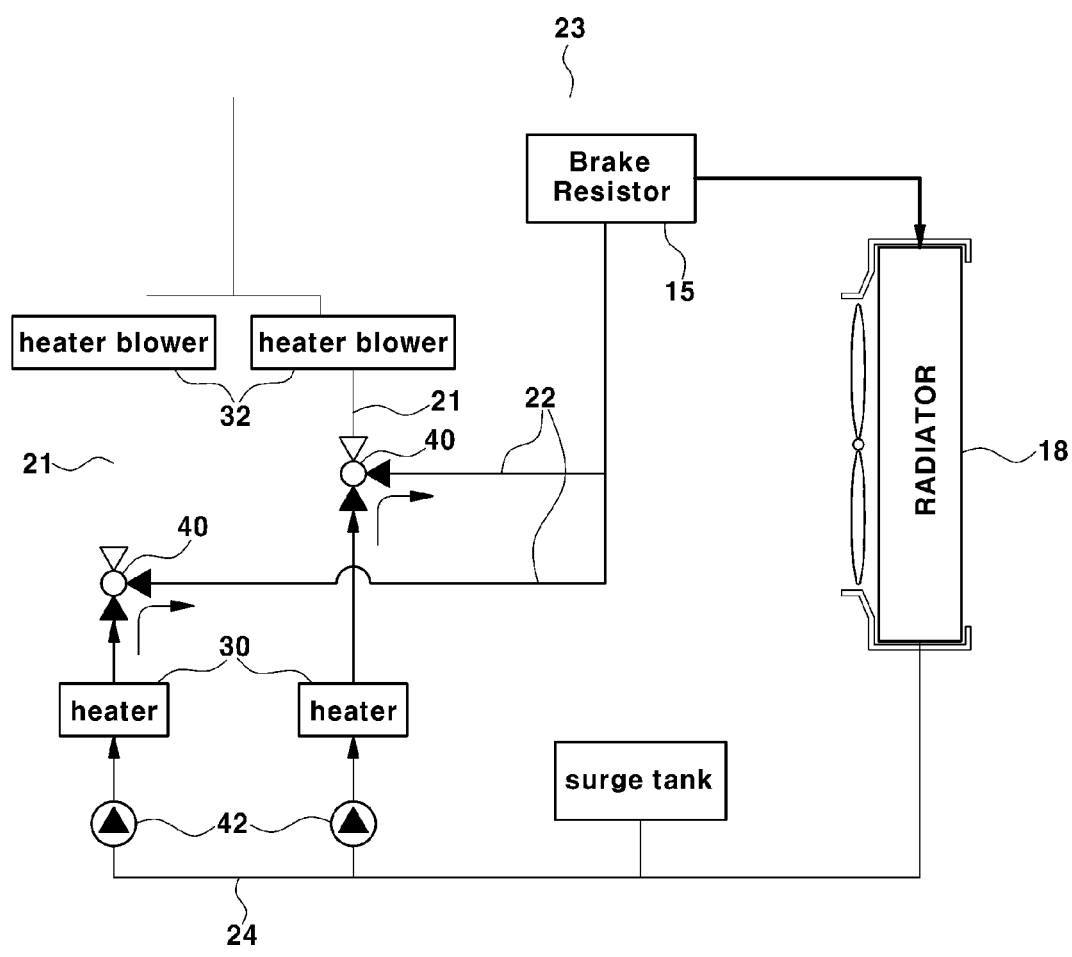
FIG. 8 is a circuit diagram showing the flow of cooling water when the regenerative braking control system for a motor-driven vehicle according to the present disclosure operates for maximum regenerative braking.

To this end, as shown in FIG. 8, the brake resistor 15 is turned on and operated, the electronic water pump 42 is also operated, and the heater 30 is also turned on in response to a control signal from the controller 50.

Further, the 3-way valve 40 is operated to an angle for closing to the heating line 21 and opening to the first cooling water return line 22 in response to the control signal from the controller 50.

Accordingly, surplus electrical energy produced by the electric motor 13 is converted into thermal energy by not only the brake resistor 15, but also the heater 30 in regenerative braking, whereby an assistant braking force can be continuously generated by continuous reverse torque of the electric motor 13.

That is, when the SOC of the battery is 100% and regenerative braking is performed in this state, since the brake resistor 15 and the heater 30 are turned on in response to a control signal from the controller 50 and the electrical energy produced by the electric motor 13 in regenerative braking wholly becomes surplus electrical energy, the surplus electrical energy is converted and consumed as thermal energy by the brake heater 15 and the heater 30 to obtain an assistant braking force by continuous reverse torque of the electric motor 13. Accordingly, a maximum assistant braking force can be generated by continuous reverse torque of the electric motor 13.

For example, when the temperature of the battery is 25° C., the battery is fully charged with SOC of 100%, and the chargeable capacity of the battery in regenerative braking is not more than 7 kW, it may be required to generate a total of 91 kW of electricity including additional power (e.g., 84 kW) for generating continuous reverse torque to satisfy a braking force required for a vehicle other than the power of 7 kW generated to charge the battery by the electric motor 13. Accordingly, in this case, there is a limit in converting and consuming the additional power (e.g., 84 kW) that is surplus electrical energy into thermal energy, using only the brake resistor 15.

Accordingly, since not only the brake resistor 15, but also the heater 30 operate and the additional power (e.g., 84 kW) that is surplus electrical energy is converted into thermal energy by the brake resistor 15 and the heater 30, it is possible to completely convert and consume the surplus electrical energy into thermal energy. Therefore, an assistant braking force can be maximally generated by continuous reverse torque of the electric motor 13.

On the other hand, as shown in FIG. 8, when low-temperature cooling water flowing through the cooling water supply line 24 from the radiator by the operation of the electric water pump 42 flows through the first cooling water return line 22, the low-temperature cooling water cools the heater 30 and the brake resistor 15 while sequentially flowing through the cooling water channels of the hater 30 and the brake resistor 15. Further, high-temperature cooling water coming out of the brake resistor 15 after cooling the brake resistor 15 flows back to the radiator 18.

As described above, since surplus electrical energy produced by the electric motor 13 can be converted into thermal energy by the heater 30 in addition to the brake resistor 15 in regenerative braking, depending on the SOC of the battery, an assistant braking force that satisfies a required braking force can be obtained by continuous reverse torque of the electric motor. Further, the thermal energy converted by the brake resistor and the heater is used as a heat source for interior heating, whereby it is possible to achieve an interior heating effect.

What is claimed is:

1. A regenerative braking control system for a motor-driven vehicle, the regenerative braking control system comprising:
    an electric motor configured to charge a battery with an electrical energy by operating as a power generator in regenerative braking;
    a brake resistor configured to convert surplus electrical energy produced by the electric motor into thermal energy in regenerative braking;
    a heater configured to convert surplus electrical energy produced by the electric motor into thermal energy together with the brake resistor;
    a cooling water circulation line connected to the brake resistor and the heater so that cooling water can circulate; and
    a controller configured to control the brake resistor and the heater to be turned on and off on the basis of charged amount information of the battery so that a heating mode, a regenerative braking mode, a heating and regenerative braking mode, and a maximum regenerative braking mode are performed.

2. The regenerative braking control system of claim 1, wherein the cooling water circulation line includes:
    a heating line extending from the heater and connected to a heater blower for interior heating;
    a first cooling water return line extending from the heating line and connected to a radiator through the brake resistor;
    a second cooling water return line extending from the heater blower and connected to the radiator; and
    a cooling water supply line extending from the radiator and connected to the heater.

3. The regenerative braking control system of claim 2, wherein a 3-way valve is controlled to be opened and closed in order to send cooling water to the heater blower or the brake resistor, the 3-way valve being disposed at a joint of the heating line and the first cooling water return line.

4. The regenerative braking control system of claim 2, wherein an electric water pump is disposed in the cooling water supply line.

5. The regenerative braking control system of claim 1, wherein, in the heating mode, the heater, an electric water pump, and a heater blower are operated, a 3-way valve is operated to open to a heating line and close to a first cooling water return line, and the brake resistor remains off in response to a control signal from the controller.

6. The regenerative braking control system of claim 5, wherein when medium-temperature cooling water heated by the heater flows through the heating line and the heater blower, air to be blown to an interior by the heater blower is heated by the medium-temperature cooling water, whereby interior heating is performed.

7. The regenerative braking control system of claim 1, wherein, in the regenerative braking mode, the brake resistor and an electric water pump are operated, a 3-way valve is operated to close to a heating line and open to a first cooling water return line, and the heater and a heater blower remain off in response to a control signal from the controller.

8. The regenerative braking control system of claim 7, wherein, in the regenerative braking mode, surplus electrical energy produced by the electric motor is converted and consumed as thermal energy by the brake resistor, whereby an assistant braking force is continuously generated by continuous reverse torque of the electric motor.

9. The regenerative braking control system of claim 7, wherein low-temperature cooling water flowing through a cooling water supply line from the radiator by operation of the electric water pump flows through a first cooling water return line and cools the brake resistor, and high-temperature cooling water coming out of the brake resistor after cooling the brake resistor flows back to the radiator.

10. The regenerative braking control system of claim 1, wherein, in the heating and regenerative braking mode, the brake resistor, an electric water pump, the heater, and a heater blower are turned on and operated, and a 3-way valve is operated to an angle for opening to both of a heating line and a first cooling water return line in response to a control signal from the controller.

11. The regenerative braking control system of claim 10, wherein the brake resistor and the heater convert surplus electrical energy produced by the electric motor into thermal energy for the regenerative braking mode, whereby an assistant braking force is continuously generated by continuous reverse torque of the electric motor.

12. The regenerative braking control system of claim 10, wherein when medium-temperature cooling water heated by the heater for the heating mode flows through the heating line and the heater blower, air to be blown to an interior by the heater blower is heated by the medium-temperature cooling water, whereby interior heating is performed.

13. The regenerative braking control system of claim 10, wherein medium-temperature cooling water heated by the heater flows to the brake resistor through a first cooling water return line by operation of the electric water pump and high-temperature cooling water after cooling the brake resistor flows to a radiator for cooling.

14. The regenerative braking control system of claim 1, wherein, in the maximum regenerative braking mode, the brake resistor, an electric water pump, and the heater are turned on and operated, a 3-way valve is operated to close to a heating line and open to a first cooling water return line, and a heater blower remains off in response to a control signal from the controller.

15. The regenerative braking control system of claim 14, wherein, in the maximum regenerative braking mode, the brake resistor and the heater convert surplus electrical energy produced by the electric motor into thermal energy, whereby an assistant braking force is continuously generated by continuous reverse torque of the electric motor.

16. The regenerative braking control system of claim 15, wherein when a State of Charge (SOC) of the battery is 100%, electrical energy produced by the electric motor wholly becomes surplus electrical energy and is converted and consumed as thermal energy by the brake resistor and the heater, whereby an assistant braking force is maximally generated by continuous reverse torque of the electric motor.

17. The regenerative braking control system of claim 14, wherein low-temperature cooling water flowing through a cooling water supply line from a radiator by operation of the electric water pump sequentially cools the hater and the brake resistor while passing through cooling water channels of the heater and the brake resistor, and high-temperature cooling water coming out of the brake resistor after cooling the brake resistor flows back to the radiator.

* * * * *